(12) United States Patent
Hogan

(10) Patent No.: US 7,352,953 B1
(45) Date of Patent: Apr. 1, 2008

(54) METHOD AND APPARATUS FOR RECORDING AND STORING VIDEO INFORMATION

(76) Inventor: Velvin R. Hogan, 306 Colville Dr., San Jose, CA (US) 95123

(*) Notice: Subject to any disclaimer, the term of this patent is extended or adjusted under 35 U.S.C. 154(b) by 1115 days.

(21) Appl. No.: 10/074,995

(22) Filed: Feb. 12, 2002

Related U.S. Application Data

(60) Provisional application No. 60/273,784, filed on Mar. 6, 2001.

(51) Int. Cl.
- *H04N 5/76* (2006.01)
- *H04N 7/00* (2006.01)
- *H04N 9/00* (2006.01)
- *H04N 11/00* (2006.01)

(52) U.S. Cl. .......................... 386/46; 386/1

(58) Field of Classification Search .............. 386/33, 386/109, 111, 112, 95, 46, 1
See application file for complete search history.

(56) References Cited

U.S. PATENT DOCUMENTS

| | | | |
|---|---|---|---|
| 5,784,572 A | * | 7/1998 | Rostoker et al. .......... 709/247 |
| 6,154,600 A | * | 11/2000 | Newman et al. ............. 386/4 |
| 6,311,011 B1 | * | 10/2001 | Kuroda ...................... 386/46 |
| 6,493,763 B1 | * | 12/2002 | Suzuki ....................... 709/231 |

* cited by examiner

*Primary Examiner*—Thai Q. Tran
*Assistant Examiner*—Nigar Chowdhury

(57) ABSTRACT

A personal video recording/storage apparatus for downloading streaming video and data contents from a number of sources and storing the video files to an internal storage device, such as a disk drive. The apparatus further has the ability to offload the video files (e.g., originally stored in the fixed storage device) to an internal removable media storage device. The video files stored in the internal storage devices may thereafter be retrieved, processed, and provided for viewing on demand at a later time (e.g., on a standard television set, a high-definition television set, flat panel display, computer monitor, or an equivalent output device). One embodiment of the invention includes an apparatus equipped with a wireless keyboard and software that enables a user to access the Web and email services, edit recorded material, download new coder/decoder (Codec) software, order a movie on demand, and/or perform other functions.

12 Claims, 7 Drawing Sheets

METHOD AND APPARATUS FOR RECORDING AND STORING VIDEO INFORMATION

CROSS-REFERENCE TO RELATED APPLICATIONS

This application relates to and claims priority from co-pending U.S. Provisional Patent Application Ser. No. 60/273,784, entitled "Method and Apparatus for Recording and Storing Video Information," filed on Mar. 6, 2001, which is hereby incorporated by reference.

BACKGROUND OF THE INVENTION

The present invention relates generally to video systems, and more particularly, to a method and an apparatus for recording and storing video information.

Personal video recording and storage systems are known in the art. Such systems typically download streaming video to an internal fixed disk drive, which may thereafter be retrieved for viewing on demand. However, such systems typically have a small and limited storage capacity and can therefore only store a limited number of movies along with data contents. As can be seen, techniques that allow for recording, storage, and replay of a large number of video files are highly desirable.

SUMMARY OF THE INVENTION

Preferred embodiments of the invention provide a personal video recording/storage apparatus for downloading streaming video and data contents from a number of sources and storing video files to an internal fixed storage device, such as a disk drive. Furthermore, one preferred embodiment of the invention offers the ability to offload these video files (e.g., originally stored in a fixed storage device) to an internal removable media storage device. The video files stored in the fixed and/or removable storage devices may thereafter be retrieved, processed, and provided for viewing on demand at a later time (e.g., on a standard television set, a high-definition television set, flat panel display, computer monitor, or equivalent).

A first aspect of the invention is directed to a video system that includes a system controller module, an internal fixed storage device, and an internal removable media storage device. The system controller module includes a processing module, a tuner, and system memory. Furthermore, the system typically includes a video processing subsystem and coder/decoder (Codec) software module used to compress and decompress streaming video files at a high compression rate to provide to the user a high level of video quality. The system further includes software used for writing to the internal fixed storage device in seamless manner, which allows contiguous video files to be retrieved for viewing on demand.

A second aspect of the invention is directed to a system equipped with a wireless keyboard, and software that enables the user to access the Web and email services, edit recorded material, download new Codec software, order a movie on demand, and/or perform other functions. The supported functions may not be mutually exclusive, and some or most supported functions can be performed concurrently in a preferred embodiment of the invention. One preferred embodiment of the invention provides a system with the capability to capture and print still frames. Some preferred embodiments of the invention provide a system compatible with one or more cable systems, Digital Broadcast Satellite (DBS), Internet broadcast, and/or terrestrial broadcast TV systems deployed in the U.S. and abroad.

Various other aspects, alternative embodiments, and alternative features of the invention are described in further detail below.

The foregoing, together with other aspects of this invention, will become more apparent when referring to the following specification, claims, and accompanying drawings.

DESCRIPTION OF THE SPECIFIC EMBODIMENTS

Optimized Head Movement Method

One embodiment of the invention provides an optimized head movement (OHM) method for writing and reading video files from a disk (e.g., a magnetic disk, magneto-optical disk, or an optical disk). This method minimizes head movement in a system where reading and writing of data can occur concurrently. The method can advantageously be used on a disk drive having more than one read/write head, and may be implemented with other storage media (e.g., magnetic storage media, magneto-optical storage media, or optical storage media) where multiple read/write heads are used. Minimizing head movement can extend the life expectancy of the disk drive and can further reduce acoustic noise produced by head assembly movement.

Figure 1A:
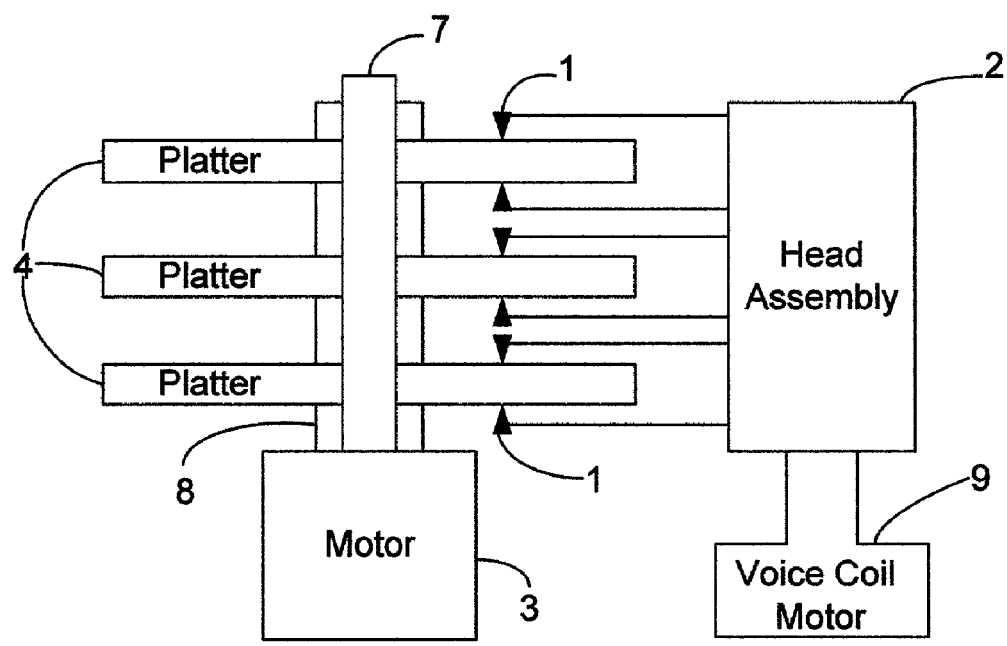
FIG. 1A is a diagram illustrating the basic mechanical components of a disk drive.

FIG. 1A is a diagram illustrating the basic mechanical components of a disk drive. As illustrated in FIG. 1A, the disk drive includes a motor 3, a spindle 7, a number of platters 4, one or more platter spacers 8, a number of read/write heads 1, a voice coil motor 9, and a head assembly 2. Each platter 4 has an upper and a lower surface of which at least one surface is used for recording.

Figure 1B:
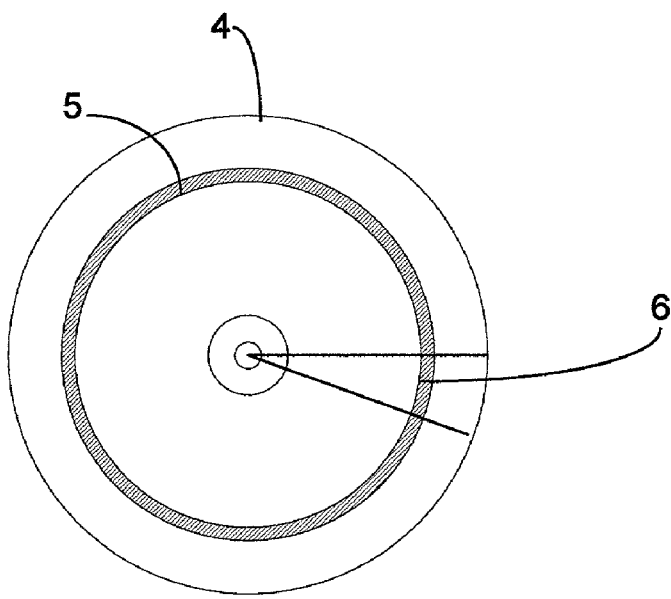
FIG. 1B is a diagram illustrating one surface of one platter.

FIG. 1B is a diagram illustrating one surface of one platter 4. Each platter surface is further divided into a number of tracks 5. A cylinder is collection of tracks from a number of platters with the same track number (i.e., same radius from the center of the platter). Each track is divided into a number of sectors 6, with a sector being the smallest segment of the disk drive that may be read from or written to.

The most common size for a disk sector is 512 bytes. One sector (e.g., 512 bytes) is typically too small for a video file. In an embodiment, a file is organized as a sequentially linked list (such as a doubly-linked list or a single-linked list), and multiple sectors are combined into one record. This organization minimizes the space used for a previous record address and a next record address used to implement a doubly-linked list for the record, or minimizes the space used for a next record address used to implement a single-linked list for the record. Another benefit from using multiple sectors per record is reduced storage fragmentation and consequently improved access speed.

A "read-ahead" method may be employed for reading data from the disk, which is also used for many conventional disks. With the read-ahead method, after reading the specified sector, the drive continues to read additional sectors till all available memory space (e.g., cache memory) is used. If storage of the file is not fragmented, the next read will be done from the cache memory, and not from the drive.

File Organization and Record Structure

Figure 2A:
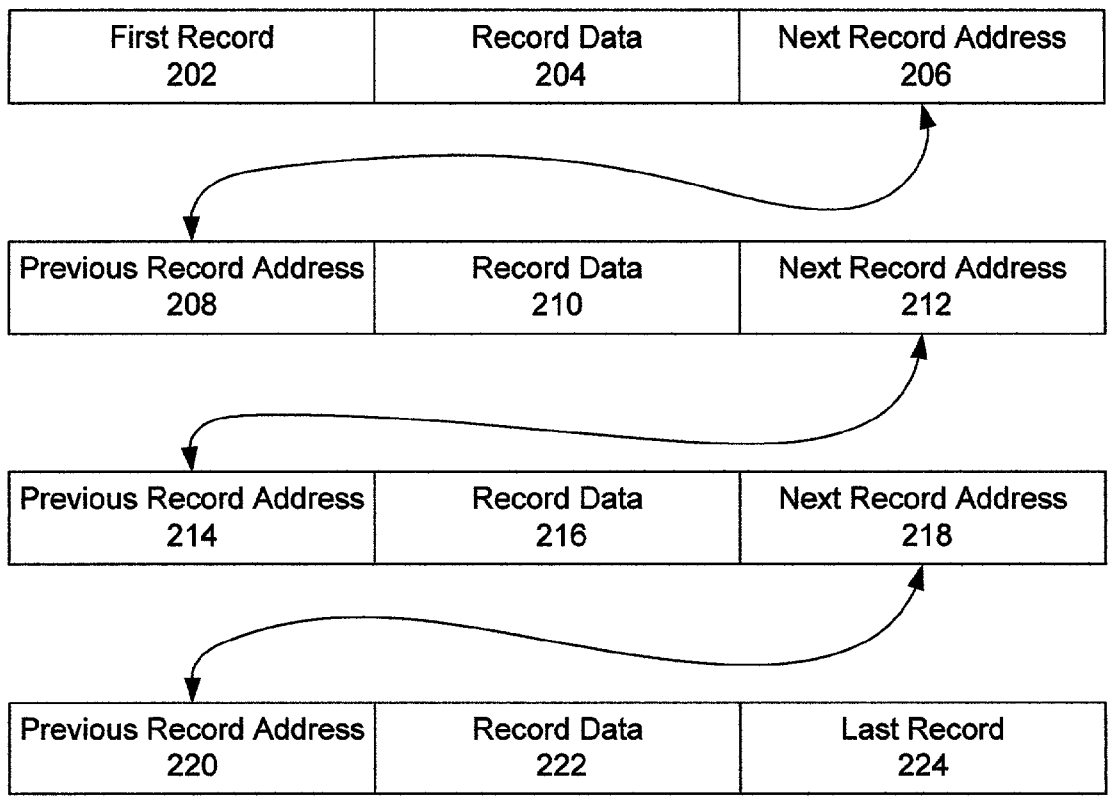
FIG. 2A illustrates an organization of a video file as a doubly-linked sequential file, in accordance with one preferred embodiment of the invention.

FIG. 2A illustrates an organization of a video file as a doubly-linked sequential file, in accordance with one preferred embodiment of the invention. Record data 204 is preceded by first record indicator 202. Record data 210, 216, and 222 are preceded by previous record address 208, 214, and 220, respectively. Record data 204, 210, 216, and 222 are followed by next record address 206, 212, and 218, respectively. Record data 222 is followed by last record indicator 224.

Each file organized in this manner includes one or more records doubly-linked together via the next and previous record address fields in each record. The first field in each record contains the address of the previous record (if one exists). For the first record, the first field contains a defined value (e.g., 0xFFFFFF, or another predetermined value). The second field contains the video data. And the third field contains the address of the next record in the file (again if one exists). The third field of the last record contains a defined value (e.g., 0xFFFFFF, or another predetermined value).

Figure 2B:
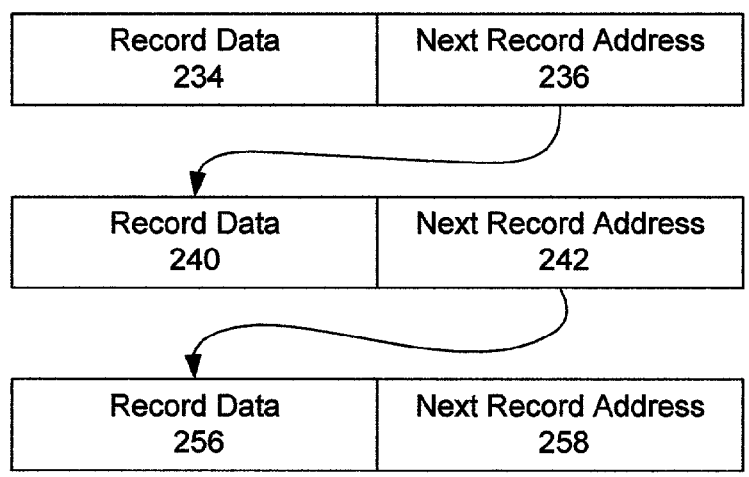
FIG. 2B illustrates an organization of a video file as a single-linked sequential file, in accordance with another preferred embodiment of the invention.

FIG. 2B illustrates an organization of a video file as a single-linked sequential file, in accordance with another preferred embodiment of the invention. Record data 234, 240, and 256 are followed by next record address 236, 242, and 258, respectively. For example, next record address 236 contains the address of record data 240, and next record address 242 contains the address of record data 256.

Figure 3:
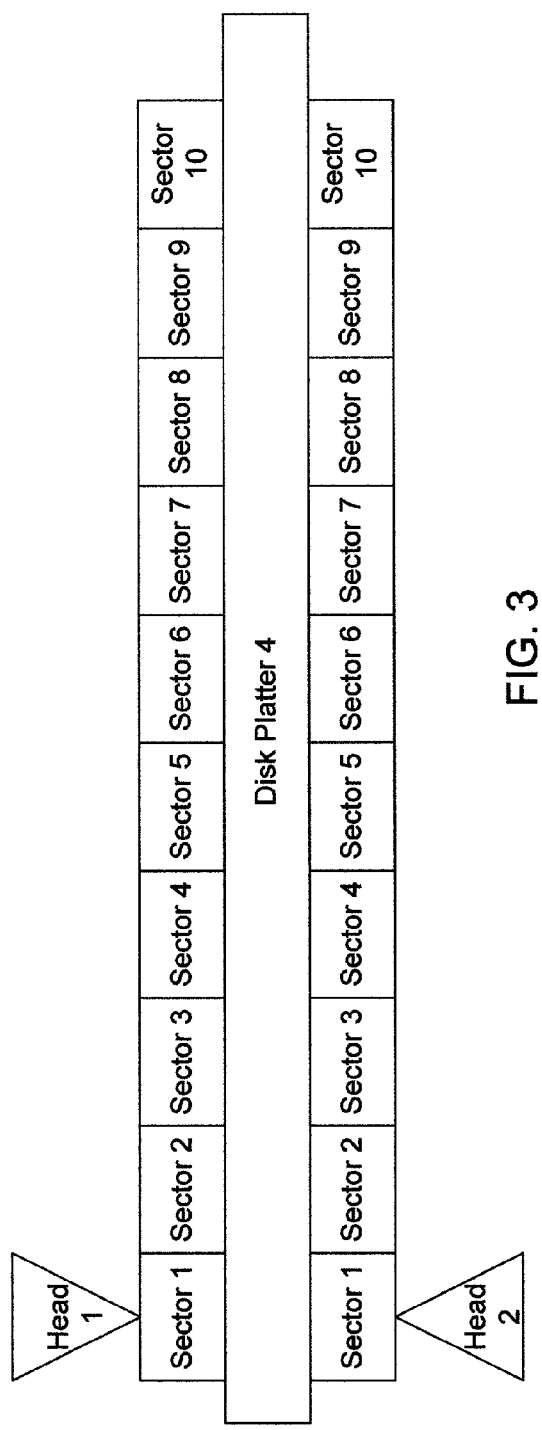
FIG. 3 illustrates the storage of a record to a number of sectors on a disk, in accordance with one preferred embodiment of the invention.

FIG. 3 illustrates the storage of a record to a number of sectors (1, 2, 3, 4, 5, 6, 7, 8, 9, and 10) on the top surface of a disk platter 4, and a number of sectors (1, 2, 3, 4, 5, 6, 7, 8, 9, and 10) on the bottom surface of the disk platter 4, in accordance with one preferred embodiment of the invention. Each record is partitioned into one or more "sections" that may be stored to one or more respective sectors on the disk. Read/write head 1 will access the top surface of disk platter 4, and read/write head 2 will access the bottom surface of disk platter 4.

Figure 4:
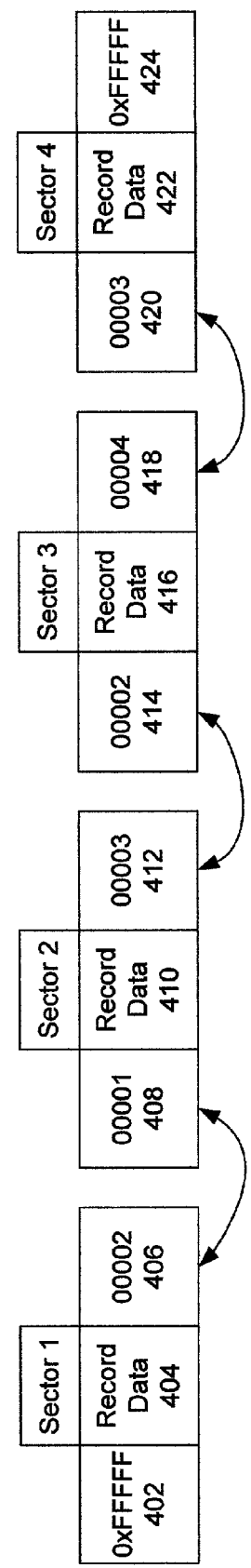
FIG. 4 illustrates the partitioning of the disk, in accordance with one preferred embodiment of the invention.

FIG. 4 illustrates the partitioning of the disk, in accordance with one preferred embodiment of the invention. In this embodiment, the sections of the record are also implemented as a doubly-link list, and each section into a first field (402, 408, 414, and 420) for storing the address of the previous sector (if one exists), a second field (404, 410, 416, and 422) for storing the video in the record, and a third field (406, 412, 418, and 424) for storing the address of the next sector (if it exists).

In an embodiment, recording starts at the first sector of a track. The system maintains a table that contains information about the disk geometry such as the number of sectors per track, the number of cylinders, heads, zones, and so on. The number of sectors per record may be fixed, or may be dynamically determined depending on the optimum ratio for each zone. This is done to simplify record creation and to maximize storage media use.

The following features may be supported in various embodiments for recording a video file:

1. In one embodiment, if recording of a first video file starts while in a playback mode for a second video file, while reading the second video file, the third field of the first record of the recorded video file will contain the address of the record (sector) on a track physically directly above or below the track (i.e., in the same cylinder) of the record being played back. A record addressed by the third field of the first record of the recorded file will be the first record with video/audio information in the file. This is done to synchronize the read and write operations, and to keep them on the same cylinder and avoid cylinder-to-cylinder seeking.

2. In one embodiment, if the reading of a second video file starts while recording a first video file, the system abandons the current track and continues recoding the first video file on another track adjacent to the one to be read, if possible. The third field of the last record of the first video file is thus written with the track address of a sector record (sector) on a track directly above or below the record being played back (i.e., in the same cylinder).

3. In one embodiment, if the system is unable to synchronize the write and read operations, it continues to use the available media, and not utilize the OHM method.

4. In one embodiment, record reorganization takes place after recording has finished. Since the system maintains a list of scheduled recordings, their date and time, the system is able to calculate if there is enough time to reorganize records before new recording starts. Preferably, the disk should be used one surface at a time. Preferably, one disk surface should be clean and ready for recording at all times, or whenever possible.

System

Figure 5:
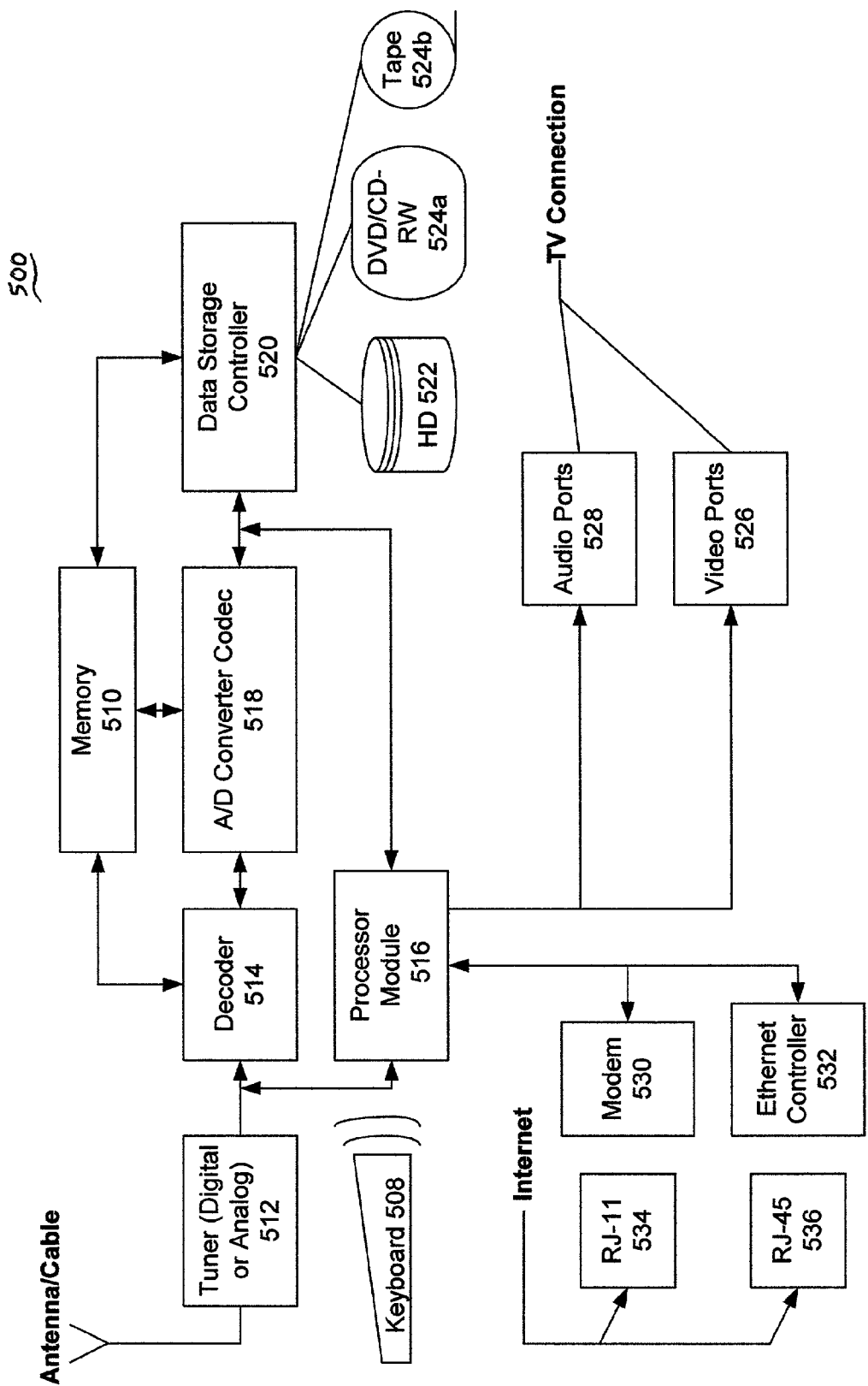
FIG. 5 is a block diagram of a personal video recording/storage system, in accordance with one preferred embodiment of the invention.

FIG. 5 is a block diagram of a personal video recording/storage system 500, in accordance with an embodiment of the invention. As illustrated in FIG. 5, system 500 includes a tuner 512 (e.g., a TV tuner, or a cable-ready TV tuner) that can receive signals from both analog and digital sources such as, a cable system, a Digital Broadcast Satellite (DBS) system, an antenna, or a terrestrial broadcast TV system, and/or some other equivalent source. These systems are typically compatible with one or more applicable video broadcast standards in the U.S. and abroad. System 500 also includes a wireless keyboard 508 (e.g., an infrared keyboard), a memory 510, a decoder 514, a processor module 516, an analog-to-digital converter Codec 518, a data storage controller 520, a disk drive 522, a R/W DVD or R/W CD drive 524a, a tape drive 524b, one or more video ports 526, one or more audio ports 528, one or more modems 530, one or more Ethernet controllers 532, one or more RJ-11 jacks 534, and one or more RJ-45 jacks 536 connected to the Internet or another computer network.

Tuner 512 receives and processes an input signal and extracts video information transmitted on the receive signal. Depending on the particular type of signal being received (i.e., whether the received signal is digital or analog in nature), tuner 512 provides either an analog signal or digital data containing the extracted video information. The analog signal is provided to a processor module 516, and the digital video data is provided to a decoder 514.

Decoder 514 receives and decodes (i.e., decompresses) the video data and provides a decoded file. In one preferred embodiment of the invention, decoder 514 performs MPEG-2 (or MPEG-4, or another version of MPEG, or Video for Windows, or Indeo, or QuickTime) decoding and/or other decoding as necessary. The decoded file may be provided to a coder/decoder (Codec) 518 for compression and recording. In one preferred embodiment of the invention, decoder 514 further provides decoded analog or digital signals to processor module 516.

In one preferred embodiment of the invention, processor module 516 further processes (e.g., conditions) the analog signal received from tuner 512 or decoder 514. Processor module 516 then provides the signals to a display (e.g., a standard television set, a high-definition television set, flat panel display, or an equivalent), and speakers via video ports 526 and audio ports 528, respectively. In one embodiment, processor module 514 includes a processor that determines how the signal is to be processed. How the signal is processed may be dependent on the current user selection in the form of commands and on a preprogrammed set of commands. For example, a user may have programmed the system to record a movie, but the user still wants to watch a game in instant playback mode.

In one preferred embodiment of the invention, Codec 518 encodes (i.e., compresses) the video file from decoder 514 using a user-selectable Codec algorithm. For example, in one preferred embodiment of the invention, motion video is compressed using an MPEG-2 encoding algorithm, and still images are compressed using a Digital Video (DV) encoding algorithm, or an equivalent algorithm is used (e.g., MPEG-3, or MPEG-4, or a competing algorithm previously listed). The compressed file is then provided to a data storage controller 520 and stored to either a fixed media storage device 522 (e.g., a disk drive), or a removable media storage device (e.g., a removable magnetic disk drive, a re-writable CD device 524a, a re-writable DVD device 524a, or a tape drive 524b, or some other removable storage device).

In various embodiments of the invention, the signal from tuner 512 can be digital or analog. Consequently, signals that are not in digital form are digitized in order to be recorded on a storage device.

In one preferred embodiment of the invention, decoder 514 also receives and processes (decompresses) video files from either the fixed or removable media storage device for viewing on demand. In one preferred embodiment of the invention, commercially available MPEG-2 decoders implemented in silicon form are used to decode digital TV and DVD input signals. On playback, a video file is decompressed using the same algorithm used to compress the files for recording. Once decompressed, the file is provided to a display for viewing.

In one preferred embodiment of the invention, a memory unit 510 is used to temporarily store video files, which may be designated for storage to the storage devices, or designated for processing by Codec 518 and/or decoder 514. In one preferred embodiment of the invention, memory unit 510 is also used to store software modules. In one preferred embodiment of the invention, these software modules include compression and decompression software to be executed by Codec 518, and other software modules (e.g., a user interface module) to be executed by a processor within processor module 516.

In an embodiment of the invention, system 500 supports the capability of stopping live video, as well as instant replay with selectable replay time interval. System 500 may also be designed with the capability to download video files and data contents from the Internet. In that case, system 500 is equipped with a (e.g., built-in) modem 530 and/or an Ethernet controller 532 and support software that enables the user to access the Internet and email services, as well as download video files.

Various embodiments of the invention provide a system 500 designed to support one or more of the following features.

1. Preferably, the user can select a particular compression (Codec) algorithm for recording the video files. System 500 preferably supports one or more compression algorithms and, for playback, and typically uses the same algorithm that was used for recording.
2. One preferred embodiment of the invention includes a system 500 that supports an "instant playback" function, and implements some or all of the following features:
   System 500 uses one of the available user-selectable Codec algorithms for data storing and playback.
   The user can select a particular time period for instant playback.
   The main memory is used for temporary storage and serves as a buffer when longer playback time frames are selected. This allows for better disk drive utilization and energy saving. In an embodiment of the invention, the disk drive is switched to a "sleep" state and awakened when needed (e.g., every 15 minutes) for the memory contents to be dumped and then put to sleep again.
3. Some preferred embodiments of the invention allow recording with optimized head assembly movement:
   To reduce head movement, recording and reading are designed to occur on the same disk cylinder whenever possible.
   Recording starts at the first sector on a track. If playback is in progress when recording starts, the first sector of the newly recorded content contains a pointer to a sector below or above the sector currently being read. This minimizes cylinder-to-cylinder seek delay for the purpose of recording and playback.
   If playback starts while recording, the system writes a record with a pointer that points to a sector on the same cylinder on a track either above or below the sector being played back, depending on the available free space on the storage device.
4. Preferably, record reorganization takes place after recording has finished. The system maintains a list of scheduled recordings, the date and time, and determines whether there is enough time to reorganize records before starting a new recording. The system attempts to use one surface of the disk at a time. Preferably, one disk surface should be clean and ready for recording at any given time.
5. Preferably the user can choose to erase advertisements from recordings or to record without advertisements. This may be accomplished through pattern recognition, or by selecting the portion of a recording to be erased. An erased area is marked as free space on the disk.

6. Preferably, cut, copy, and paste functions are also supported. Records may be organized as double-linked lists. The cut, copy, and paste functions may be accomplished via manipulation of the next and previous addresses of records used to store the files, as described in further detail below.

Figure 6:
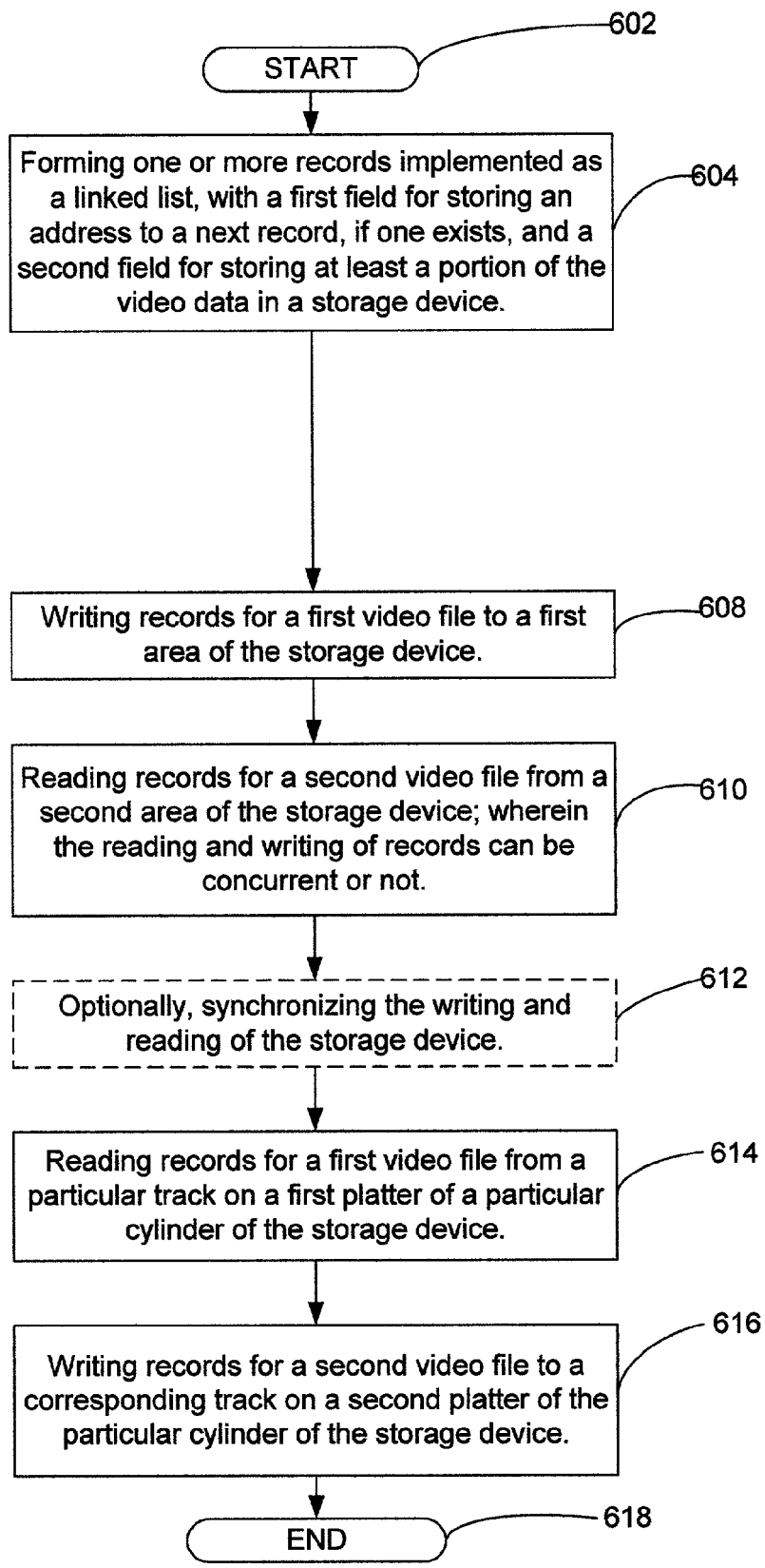
FIG. 6 is a flow chart for implementing a video recording/storage system, in accordance with one preferred embodiment of the invention.

FIG. 6 is a flow chart for implementing a video recording/storage system, in accordance with one preferred embodiment of the invention. The method starts in operation 602, and is followed by operation 604. Operation 604 includes forming one or more records implemented as a linked list, with a first field for storing an address to a next record, if one exists, and a second field for storing at least a portion of the video data in a storage device. Operation 608 is the next operation that includes writing records for a first video file to a first area of the storage device. Operation 610 is the next operation that includes reading records for a second video file from a second area of the storage device; wherein the reading and writing can be concurrent or not, as desirable. Operation 612 is an optional next operation that includes synchronizing the writing and reading of the storage device. Operation 614 is the next operation that includes reading records for a first video file from a particular track on a first platter of a particular cylinder of the storage device. Operation 616 is the next operation that includes writing records for a second video file to a corresponding track on a second platter of the particular cylinder of the storage device. Operation 618 is the end of the method.

Figure 7:
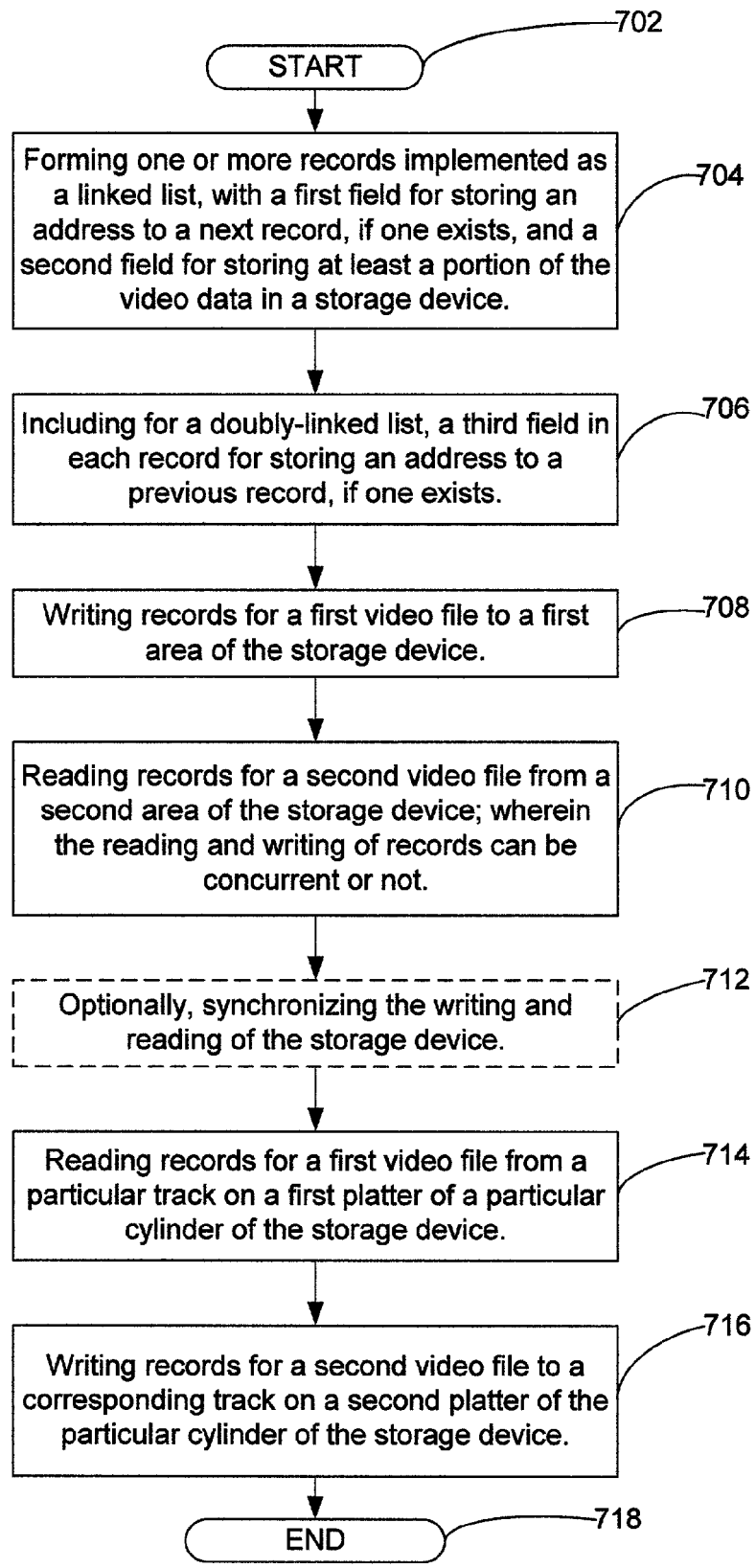
FIG. 7 is a flow chart for implementing a video recording/storage system, in accordance with another preferred embodiment of the invention.

FIG. 7 is a flow chart for implementing a video recording/storage system, in accordance with another preferred embodiment of the invention. The method starts in operation 702, and is followed by operation 704. Operation 704 includes forming one or more records implemented as a linked list, with a first field for storing an address to a next record, if one exists, and a second field for storing at least a portion of the video data in a storage device. Operation 706 is the next operation which includes for a doubly-linked list, a third field in each record for storing an address to a previous record, if one exists. Operation 708 is the next operation that includes writing records for a first video file to a first area of the storage device. Operation 710 is the next operation that includes reading records for a second video file from a second area of the storage device; wherein the reading and writing can be concurrent or not, as desirable. Operation 712 is an optional next operation that includes synchronizing the writing and reading of the storage device. Operation 714 is the next operation that includes reading records for a first video file from a particular track on a first platter of a particular cylinder of the storage device. Operation 716 is the next operation that includes writing records for a second video file to a corresponding track on a second platter of the particular cylinder of the storage device. Operation 718 is the end of the method.

Various embodiments of the invention can provide on-demand multimedia content across a traditional cable access television (CATV) infrastructure. Preferably, various embodiments are IP-based, to leverage the current data infrastructure and offer cable subscribers interactive TV with innovative Video-on-Demand (VoD) technology.

For example, one embodiment can act as a multimedia content distribution system (MCDS) positioned as an IP-based appliance suitable for installation in the data portion of a multi-service organization's (MSO) network. In this embodiment, the MCDS is preferably placed as close as possible to the head-end device, but the MCDS is still far enough upstream that it can offer multimedia content to several thousand users.

Preferred embodiments of the MCDS deliver IP-based VoD across a CATV infrastructure. The MCDS receives DVD-based video as a source, manipulates the video, and prepares the video for storage. When a user request is made, the MCDS delivers a low bandwidth, high quality stream of video to one or more users for viewing. Preferably, the MCDS works in conjunction with conventional CATV set-top box technology to deliver services.

Another commonly used cable system is a cable modem termination system (CMTS), which is a system of devices located in the cable head-end that allows cable television operators to offer high-speed Internet access to home computers. A CMTS sends and receives digital cable modem signals on a cable network, receiving signals sent upstream from a user's cable modem, converting the signals into IP packets and routing the signals to an Internet Service Provider for connection to the Internet. A CMTS also can send signals downstream to the user's cable modem. Conventional cable modems do not communicate directly with each other; but instead they communicate by channeling their signals through a CMTS. A CMTS provides many of the same functions provided by a digital subscriber line access multiplexer (DSLAM) in a digital subscriber line (DSL) system.

Figure 8:
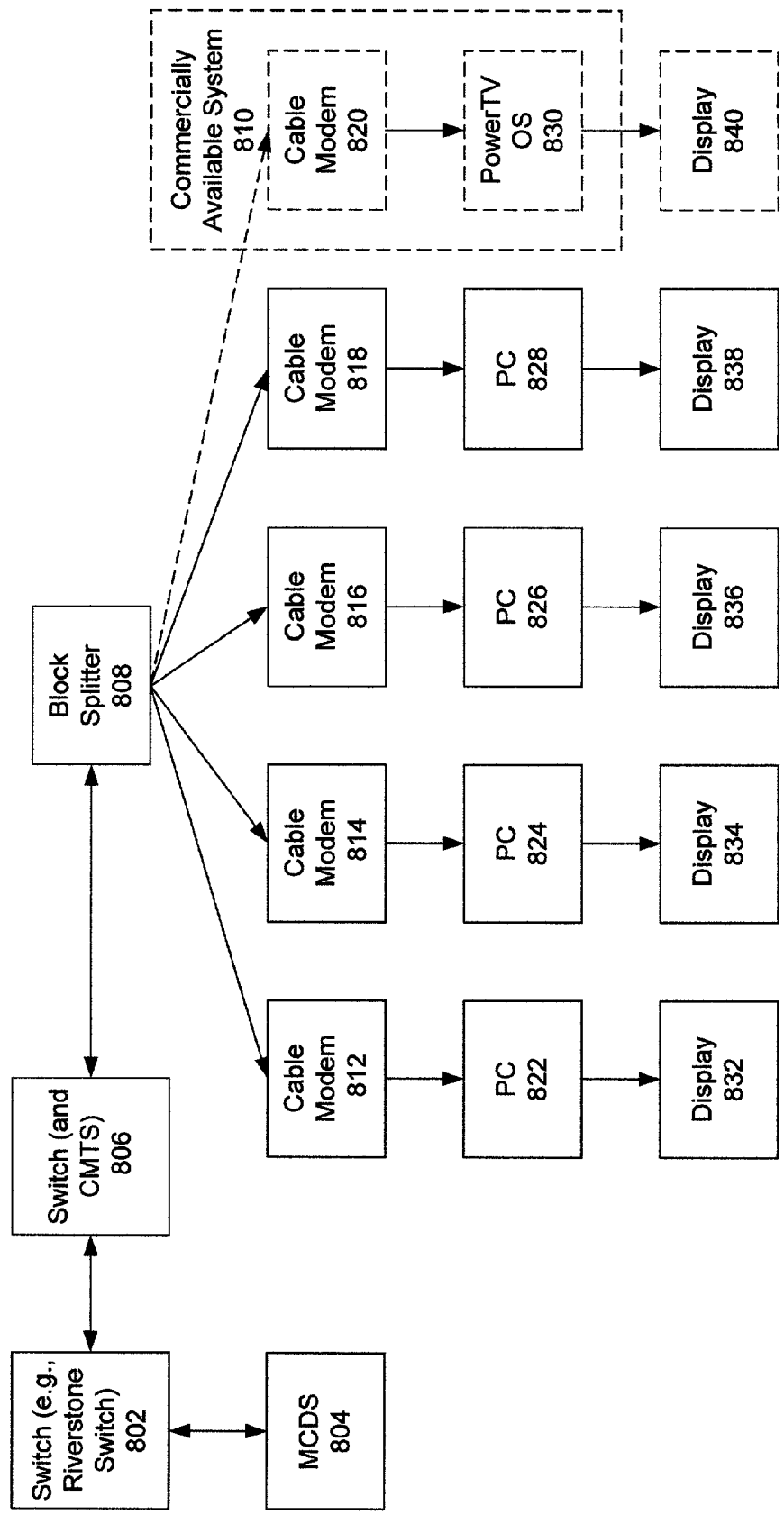
FIG. 8 is a block diagram of a video recording/storage system, in accordance with another preferred embodiment of the invention.

FIG. 8 is a block diagram of a video recording/storage system, in accordance with another preferred embodiment of the invention. This embodiment includes a Switch (e.g., a Riverstone Switch or another commercially available equivalent Switch) 802 connected to a MCDS 804 and a Switch and CMTS 806, which is in turn connected to a block splitter 808. The block splitter 808 is connected to cable modems 812, 814, 816, and 818. Optionally, the block splitter 808 is also connected to a commercially available system 810 that includes a cable modem 820. Cable modems 812, 814, 816, and 818 are connected to personal computer (PC) 822, 824, 826, and 828, respectively. The optional commercially available system 810 includes a PowerTV operating system (OS) 830 connected to the cable modem 820. PC 822, 824, 826, and 828 are connected to displays 832, 834, 836, and 838, respectively. Optional commercially available system 810 is connected to a display 840. For example, a commercially available system 810 that includes the cable modem 820 and the PowerTV OS 830 is packaged as a Scientific Atlanta Explorer 4000. This system is manufactured by Scientific Atlanta, headquartered in Lawrenceville, Ga. Equivalent boxes are available from other commercial suppliers.

The following list of features can be selectively incorporated individually, or in combination, in alternative embodiments of the invention.

A PC-based platform running a NetBSD OS with a peripheral component interconnect (PCI) bus
A DVDROM drive for a multimedia source
An Ethernet network interface card (NIC)
A transmission control protocol/Internet protocol (TCP/IP) stack
Video processing hardware (e.g., the hardware previously discussed, or equivalent video processing hardware)
A Divix Networks Codec (software-based), or an equivalent, for proprietary data compression
A HyperText Transfer Protocol (HTTP) daemon (i.e., a server program)
A basic VoD interface (with a HyperText Markup Language format, or an equivalent)

10 Gigabits or more of disk storage, with various levels of redundancy, such as, RAID Level 5 or 4 redundancy, or an equivalent redundancy Seamless flow of video streaming using proprietary storage algorithms (e.g., the algorithms previously discussed, or equivalents)

Support for 10 or more simultaneous streams of video

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments illustrated herein but is to be accorded the widest scope consistent with the principles and novel features disclosed herein, and as defined by the following claims.

What is claimed is:

1. A video system comprising:

a system controller module, consisting of one tuner, wherein the tuner is configured to receive a process one or more input signals and provide one or more video signals, with at least one processor module coupled to the tuner, wherein the at least one processor module is configured to receive and process the one or more video signals from the tuner and to provide at least one output video signal, with a decoder coupled to the tuner, wherein the decoder is configured to receive and decode the one or more video signals from the tuner to provide at least one decoded video file, and a memory unit configured to store the at least one decoded video file, wherein the system controller module is operative to receive and process the one or more input signals to provide the one or more video files, wherein the system controller module provides a user-selectable option of editing one or more sections of the one or more video files, and wherein the system controller module does not include a separate program information receiver;

an internal fixed storage device operatively coupled to the system controller module, wherein the internal fixed storage device is configured to store the one or more video files from the system controller module; and an internal removable media storage device operatively coupled to the system controller module, wherein the internal removable media storage device is configured to store the one or more video files from the system controller module or the internal fixed storage device.

2. The video system of claim 1, wherein the system controller module further includes:

a coder/decoder (Codec) operatively coupled to the decoder, wherein the coder/decoder is configured to receive and compress the decoded file to provide a compressed video file suitable for storage to the internal fixed storage device or the internal removable media storage device.

3. The video system of claim 2, wherein the Codec is configured to compress the decoded file in accordance with a particular compression algorithm selected from among a plurality of available compression algorithms.

4. The video system of claim 3, wherein the particular compression algorithm is user-selectable.

5. The video system of claim 1, wherein the system controller module is further configurable to receive and process one or more video files from the internal fixed storage device or the internal removable media storage device.

6. The video system of claim 1, wherein the system controller module is further configurable to capture an interval of a particular input signal and to store the captured data within a video file suitable for replay at a later time.

7. The video system of claim 6, wherein the interval of a particular input signal is user-selectable.

8. The video system of claim 1, wherein the system controller module is further configurable to capture selected sections of a particular input signal and to store the selected sections of a particular input signal within a video file suitable for replay at a later time.

9. The video system of claim 8, wherein the selected sections of the input signal do not include advertisements.

10. The video system of claim 1, wherein the system controller module is further configurable to manipulate sections of at least one video file using optimized head movement via a set of functions.

11. The video system of claim 10, wherein the set of functions includes functions selected from the group of functions consisting of cut, copy, paste, or a combination thereof.

12. The video system of claim 1, wherein each video file is stored to the internal fixed storage device as one or more records.

* * * * *